(12) United States Patent
Fischer et al.

(10) Patent No.: US 7,789,217 B2
(45) Date of Patent: Sep. 7, 2010

(54) DUST CONTROL MATERIAL TRANSFER SYSTEM

(75) Inventors: John S. Fischer, Boulder, CO (US);
Douglas Glenn Osborn, Bennett, CO (US)

(73) Assignee: CCC Group, Inc., San Antonio, TX (US)

( * ) Notice: Subject to any disclaimer, the term of this patent is extended or adjusted under 35 U.S.C. 154(b) by 302 days.

(21) Appl. No.: 11/954,820

(22) Filed: Dec. 12, 2007

(65) Prior Publication Data

US 2009/0152073 A1    Jun. 18, 2009

(51) Int. Cl.
*B65G 47/04* (2006.01)

(52) U.S. Cl. .................. 198/525; 198/532; 198/550.2; 198/561

(58) Field of Classification Search .......... 198/525, 198/532, 534, 550.2, 560, 561, 562
See application file for complete search history.

(56) References Cited

U.S. PATENT DOCUMENTS

| | | | |
|---|---|---|---|
| 105,807 A | | 7/1870 | Johnson |
| 1,803,689 A | | 5/1931 | Bernadt |
| 2,120,506 A | | 6/1938 | O'Rourke |
| 2,219,226 A | * | 10/1940 | Gerber ............... 193/17 |
| 2,742,185 A | | 4/1956 | Landry |
| 2,859,873 A | * | 11/1958 | Bresee ............... 193/28 |
| 3,057,454 A | | 10/1962 | Frasch et al. |
| 3,305,128 A | | 2/1967 | Dearsley |
| 3,532,099 A | | 10/1970 | Fuchu et al. |
| 3,583,582 A | | 6/1971 | Ostarello |
| 3,731,397 A | | 5/1973 | Kayatz et al. |
| 4,140,217 A | | 2/1979 | Dell |
| 4,315,468 A | | 2/1982 | Tyer et al. |

(Continued)

FOREIGN PATENT DOCUMENTS

DE     3441411     4/1986

(Continued)

OTHER PUBLICATIONS

Tooker, G.E., Establishing Design Criteria for Fugitive Dust Collection. Bulk Solids Handling, Aug. 1985, pp. 865-869, vol. 5, No. 4, www.bl.uk.

(Continued)

*Primary Examiner*—James R Bidwell
(74) *Attorney, Agent, or Firm*—Gunn, Lee & Cave, P.C.

(57) ABSTRACT

A device for eliminating fugitive material dust emanating from material being transferred from an upper conveyor, feeder or crusher to a lower position, or other location. The device allows adjustability of the chute's total flow capacity where increased capacity is required. The device has a sliding gate disposed in the hopper to control the rate of transfer of the material from the hopper. A chute is disposed below the hopper and is movable in both a lateral direction (transverse to the direction of belt travel), and movable in the axis of belt travel. A choke is slidably attached to the chute, and slidable therein. The gate is positioned to maintain a level of material in the hopper to prevent dust from emanating out of the hopper from the chute. The choke is positioned to reduce airflow through the material as it passes through the chute to a lower position.

40 Claims, 8 Drawing Sheets

U.S. PATENT DOCUMENTS

| | | | |
|---|---|---|---|
| 4,331,084 | A | 5/1982 | Fitch et al. |
| 4,371,477 | A | 2/1983 | Karowiec et al. |
| 4,372,730 | A | 2/1983 | Ladt |
| 4,390,090 | A | 6/1983 | Kossebau |
| 4,410,076 | A | 10/1983 | West et al. |
| 4,512,705 | A | 4/1985 | Gutsch |
| 4,678,076 | A | 7/1987 | Nenakhov et al. |
| 4,784,755 | A | 11/1988 | Taylor |
| 4,821,861 | A | 4/1989 | Shanahan |
| 4,876,879 | A | 10/1989 | Ruesch |
| 4,962,894 | A | 10/1990 | Galgana |
| 5,052,451 | A | 10/1991 | Gentilcore |
| 5,129,508 | A | 7/1992 | Shelstad |
| 5,494,150 | A | 2/1996 | McDonell et al. |
| 5,553,968 | A | 9/1996 | Campbell |
| 6,000,533 | A | 12/1999 | Bradbury et al. |
| 6,135,171 | A | 10/2000 | Weakly et al. |
| 6,176,368 | B1 | 1/2001 | Bradbury et al. |
| 7,228,956 | B2 | 6/2007 | Pircon et al. |
| 7,364,034 | B1 * | 4/2008 | Clark et al. ............ 198/525 |
| 2004/0182673 | A1 | 9/2004 | Baller |

FOREIGN PATENT DOCUMENTS

| | | |
|---|---|---|
| EP | 0714837 | 9/2000 |

OTHER PUBLICATIONS

Tooker, G.E., Controlling Fugitive Dust Emissions in Material Handling Operations. Bulk Solids Handling, May 1992, vol. 12, No. 2.

Tooker, G.E., Trouble Shooting Dust Collection Systems. 1995, pp. 1-13, Air Control Science, Inc.

Morrison, Joseph N. Jr., Controlling Dust Emissions at Belt Conveyor Transfer Points. Society of Mining Engineers (AIME), Mar. 1971, pp. 47-53, Transactions, vol. 250.

Drinker, Philip, S.B., Ch.E. and Hatch, Theodore, B.S., S.M., "Hygienic Significance, Measurement, and Control Industrial Dust." 1954, pp. 218-229, 2d Ed., McGraw-Hill Book Company, Inc., New York, London, Toronto.

Industrial Ventilation, A Manual of Recommended Practice. Committee on Industrial Ventilation, American Conference of Governmental Industrial Hygienists, 1974, USA.

Hemeon, W.C.L., Plant and Process Ventilation. 1963, pp. 120-159, 2d Ed., The Industrial Press, New York.

Swinderman, R. Todd, P.E., Goldbeck, Larry J., Stahura, Richard P., and Marti, Andrew D., The Pyramid Approach to Control Dust and Spillage From Belt Conveyors. Foundations 2, 1997, pp. 1-154, Martin Engineering, Neponset, Illinois.

The Dustless Transfer, Air Control Science, Boulder, Colorado, Sep. 1998.

Gulf Easy Flow Transfer Chute Technology. Gulf Conveyor Systems Pty Ltd., Aug. 30, 1996, pp. 1-8, Australia.

Prok "Smooth Line" Transfer Systems, Innovative Engineered Solutions. Prok International, Sep. 2007.

Weakly, L. Alan, Passive Enclosure Dust Control System. Society of Mining Engineeers (SME) Annual Meeting and Exhibit, Bulk Material Handling, Mar. 1, 2000, pp. 1-13, Society for Mining Metallurgy, and Exploration, Inc., Salt Lake City, Utah.

Hawk, Minor C., Bulk Materials Handling vol. 1, pp. 421-436, University of Pittsburgh School of Engineering Publication Series, No. 3, Pittsburgh, Pennsylvania, Jan. 1971.

* cited by examiner

DUST CONTROL MATERIAL TRANSFER SYSTEM

BACKGROUND OF THE INVENTION

1. Field of the Invention

The present invention relates generally to dust control systems. More specifically, the invention relates to a dust control system for transferring material from an upper conveyor to a lower conveyor. During transfer of the material, the present invention minimizes induced airflow through the transfer device and across the material. In this manner, dust emanating from the material during transfer of the material is greatly reduced during transfer. Furthermore, the invention allows there to be adjustable capacity of the chute so that flow of material through the chute may be permanently or temporarily increased easily.

2. Description of the Related Art

When material such as coal, minerals or grains are transferred from one place to another, fugitive dust is inherently created by air flowing through the material during the transfer process. As material falls or is projected from a first position to a second position (for instance, from an upper conveyor to a lower conveyor), a stream is formed. The particles in the stream impart frictional drag on the surrounding air. The surrounding air begins to flow downward in the general direction of the material stream. This is called an induced airflow. At the end of the fall or projection, the velocity of the airflow is converted into static pressure due to the sudden stop of the material stream. This static pressure creates an area of high air pressure.

The area of high air pressure must flow into an area of lower air pressure. As this occurs, the small particles of the material are suspended in the air, creating a dust. Such dust emanates from the material (as evidenced by a cloud of dust emanating from the termination of the projection or fall of the material), contaminating the air and leaving a light film on everything in the vicinity of the material transfer device. Such material dust is often harmful to breathe and often the dust is explosive and frequently causes fires or explosions. In fact, fugitive dust emanating from such materials is heavily regulated by the Occupational Safety & Health Administration (OSHA) and in the mining industry, the Mine Safety and Health Administration (MSHA).

Various passive systems have been employed over the years to help reduce such fugitive dust during transfer of material from a first location to a second location. Generally, such passive systems use a housing surrounding the material transfer devices to contain air carrying suspended particles and to prevent the contaminated air from being vented into the ambient environment. The housing creates a region of low pressure therein to draw in the contaminated higher air pressure. Examples of such systems are fully disclosed in U.S. Pat. No. 6,000,553 to Bradbury, et al. and U.S. Pat. No. 6,176,368 to Bradbury, et al.

Active methods and systems of attempting to control such fugitive dust include filtering the dust into a filtration system, or wetting the material with chemicals to weigh down the lighter dust particles. Beyond consolidating the stream of material which is employed in conjunction and at time mutually exclusive from passive control, none of the active or passive systems for controlling fugitive dust take complete measures to reduce the induced airflow from the material as it falls or is projected. Therefore, it is desirable to have a system that substantially reduces fugitive dust by reducing induced airflow through the material as it is transferred from an upper location to a lower location.

BRIEF SUMMARY OF THE INVENTION

It is therefore an object of the present invention to provide a system for reducing fugitive material dust from material during a transfer of material from an upper conveyor to a lower conveyor.

It is another object of the present invention to reduce the airflow through the material transferring device during transfer of the material.

It is another object of the present invention to provide a system that substantially prevents fugitive material dust from emanating out of the material transferring device.

It is another object of the present invention to provide a system for reducing fugitive material dust from material by reducing airflow through the material transfer device that is adjustable to accommodate different materials and varying quantities, or in some cases, characteristics of material.

It is another object of the present invention to create an adjustable capacity in the chute of the present invention to allow permanent or temporary increase of flow of material there through.

A material transfer system that reduces fugitive material dust by reducing induced airflow through the transfer chute (and therefore across the material) as the material is transferred from an upper conveyor to a lower conveyor or position is disclosed. A hopper has an opening to receive a portion of an upper conveyor and the material. The upper conveyor is rotatably attached to the hopper by a pulley which extends across the opening of the hopper. The speed of the upper conveyor is controlled by a motor attached to the hopper and the pulley.

A door is attached to the hopper at a position substantially across from the pulley inside the hopper, and covers a second opening. The door allows access to the hopper portion of the present invention as well as the pulley and upper conveyor for maintenance, repair and cleaning.

The hopper is generally arcuately shaped, and extends downward to communicate with a chute. As the hopper extends downward, the volume therein gradually and consistently decreases, creating a funnel passageway into the chute. The hopper has an open bottom. The opening in the bottom of the hopper extends along a portion of the sidewall of the hopper to provide a top portion of an opening for receiving a choke.

A slidable gate is attached to the hopper and disposed within the hopper. In the preferred embodiment, the gate is disposed along an angular wall of the hopper such that the gate slides diagonally downward and across the hopper. The gate is slidably adjustable to control the rate of flow of material from the hopper to the chute. The gate is adjusted to a position that retains a desirable level of material in the hopper. Maintaining a desirable level of material in the hopper prevents air from flowing upward through the chute and into the hopper.

A chute is disposed directly below the hopper. The chute is generally arcuately shaped and has an open top as well as an open bottom. The open bottom extends vertically along a portion of the sidewall of the chute and connects with the open top of the chute, creating an opening in the sidewall of the chute that corresponds to the opening of the sidewall of the hopper. The opening in the sidewall of the chute receives an adjustable choke. A top portion of the choke slightly extends into, and is received by the corresponding opening in the sidewall of the hopper.

A choke is slidably attached to the chute within the opening in the sidewall therein, and extends vertically through the corresponding opening in the sidewall of the hopper. The choke is operated by a motor attached to the chute. A sliding member is attached to the motor and the choke. Thus, energizing the motor moves the sliding member, thereby sliding the choke within the chute to the desired position.

The chute has two tilting members which are attached to the hopper on their first ends, and to the chute on their second ends. The chute is further attached to the hopper by a universal joint to allow omni-directional movement. Disposed between the chute and the hopper is a flexible sleeve, which extends to and covers the space between the hopper and the choke. Operation of the tilting members allows the chute to be moved in both (a) a direction transverse to the direction of belt travel of the lower conveyor, and (b) a direction of an axis of the belt travel of the lower conveyor. By allowing the chute to be moved in the transverse direction to the direction of the belt of the lower conveyor, the on-load of the material onto the lower conveyor can be centered on the lower conveyor. By allowing the chute to be moved in the direction of the axis of belt travel of the lower conveyor allows either accelerated or slowed flow of the material onto the lower conveyor.

In operation, material is loaded onto the upper conveyor, which transports the material to the hopper. The gate is adjusted to control the transportation of the material from the hopper to the chute while maintaining a desired amount of material within the hopper to prevent airflow from emanating from the chute through the hopper.

As the material passes through the gate and into the chute, the choke is slidably adjusted to a desired position. The desired position of the choke is the position which allows enough space for only the material to flow through the chute to the lower conveyor, and not enough space for induced air to flow through the chute. In this manner, induced airflow through the material is substantially reduced.

At least one and preferably two level sensors are disposed within the hopper above the gate. A lower level sensor senses the rate of flow of material across the lower level sensor, and relays that information via a signal to a control unit. Where the flow of material across the lower level sensor is at a desirable rate, the control unit in turn controls (a) the motor of the upper conveyor, (b) the position of the gate, and/or (c) the position of the choke to maintain the desirable rate of flow of material through the hopper. In this manner, the lower level sensor is in substantially constant communication with the control unit. However, in the alternative, the lower level sensor may send flow rate signals to the control unit on a predetermined intermitted basis—for example, every ten seconds or fifteen seconds. In addition to sensing the rate of flow of material, the lower level sensor senses the presence of absence of material. An upper level sensor likewise senses the presence or absence of material. Thus, the upper level sensor and lower level sensor sense an amount of material in the hopper that is desirable. When the amount of material in the hopper reaches an undesirable level, the sensors send an event signal to the control unit. The control unit in turn (a) controls the motor of the upper conveyor, (b) adjusts the position of the gate, and/or (c) slides the choke within the chute to return the heel of material in the hopper to a desirable level.

The control unit further controls the tilting members. The tilting members allow the chute to be moved in both a direction transverse to the direction of belt travel of the lower conveyor, and a direction of an axis of the belt travel of the lower conveyor.

DETAILED DESCRIPTION OF THE INVENTION

Figure 1:
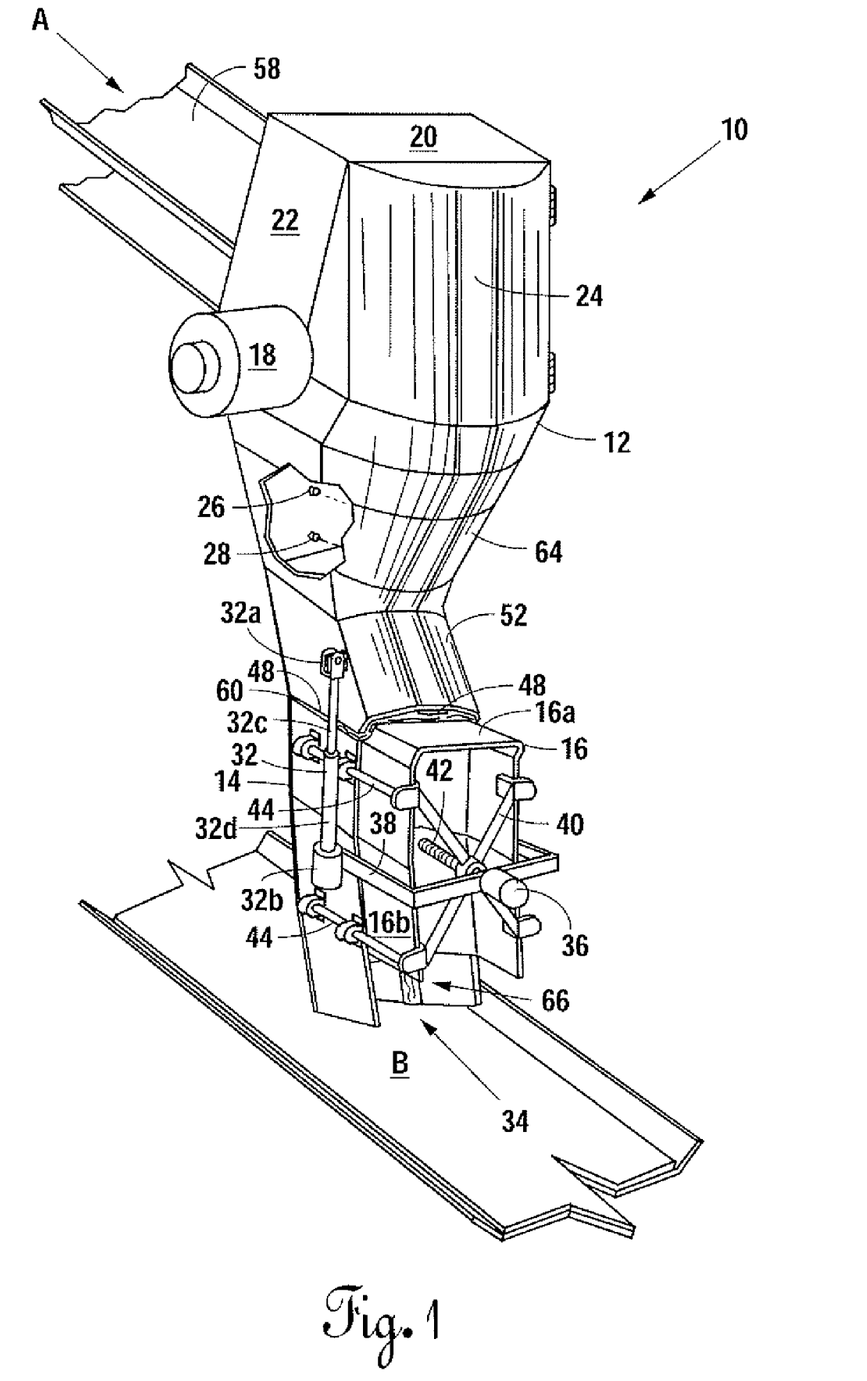
FIG. 1 is a perspective view of the present invention.
Figure 2:
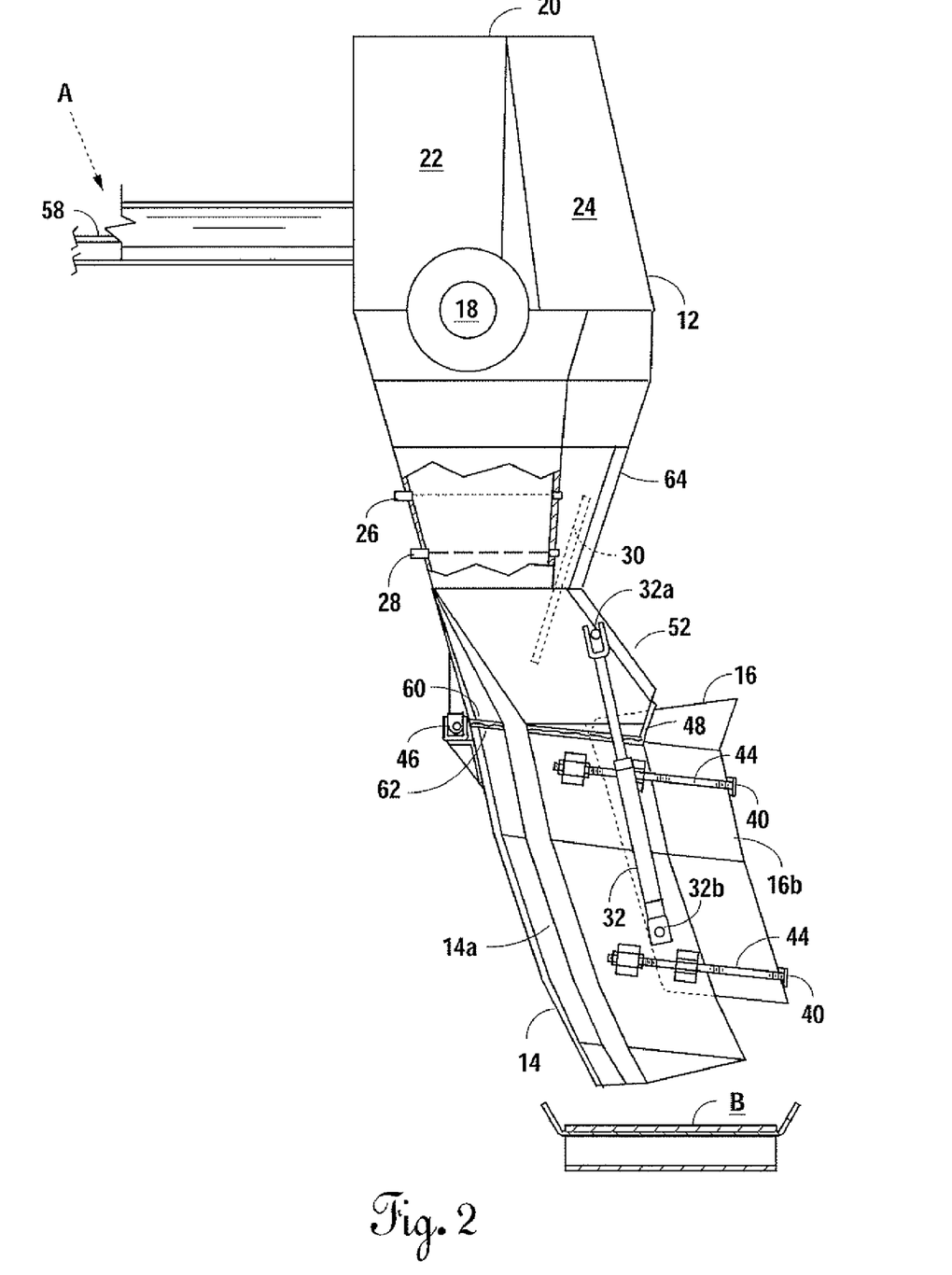
FIG. 2 is a side view of the present invention.

Referring to FIGS. 1 and 2, the preferred embodiment of the present invention is disclosed. The device 10 has a hopper 12 for receiving material M (See FIG. 4A) therein from an upper conveyor A. It is understood that the present invention can be used for transferring any material M which can be transferred by an upper conveyor A to a lower conveyor B or lower position, as long as any component part of the material M is of sufficient size to pass through the device 10. Furthermore, the device 10 can be used to transfer material from a feeder (not shown) or crusher (not shown) to another location. Examples of material M that could be transferred using the present invention include, but are not limited to, solid minerals such at coal, and primary metals elements such as bauxite, alumina, iron ore, coke, limestone, copper ore, or the like as well as grains such as wheat or corn.

Figure 6:
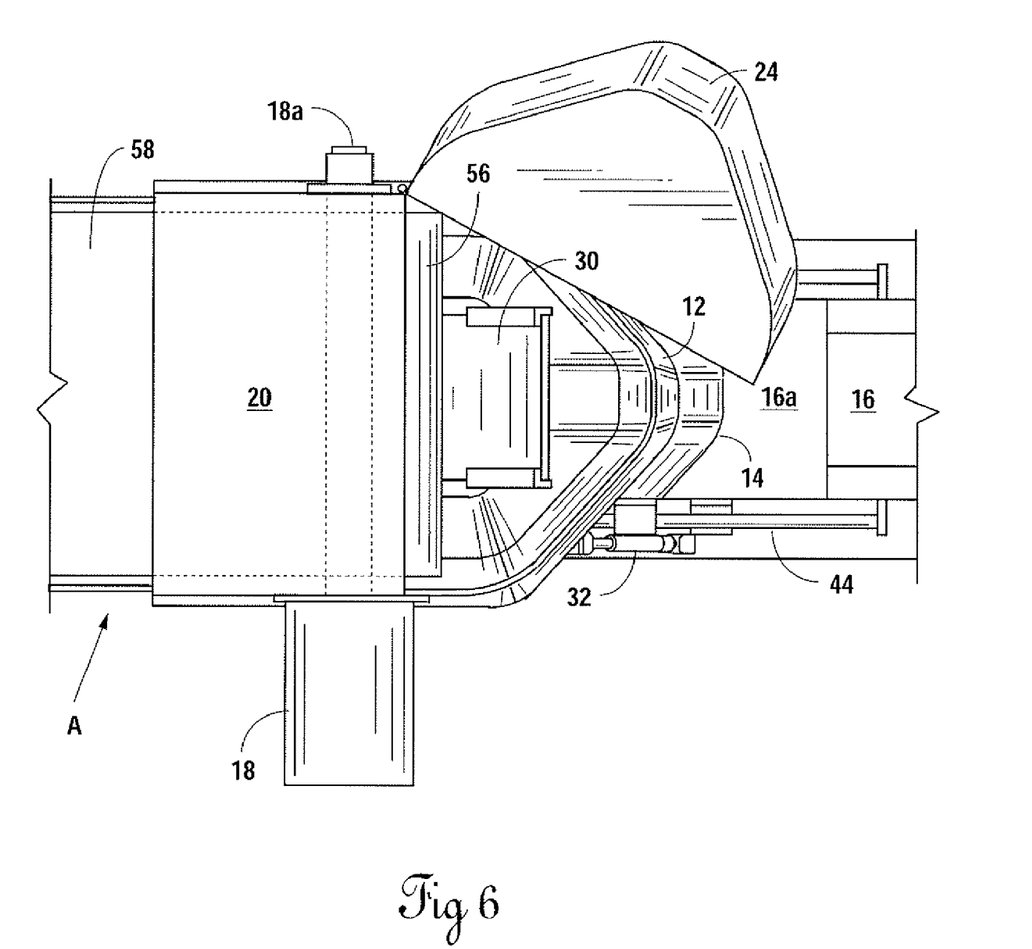
FIG. 6 is a top view of the present invention with the door open.

Referring to FIGS. 1 and 6, in the preferred embodiment, the hopper 12 has an opening (not shown) for receiving an off-loading end 56 (See FIG. 6) of the upper conveyor A and the material M. The sidewall 22 and the top panel 20 of the hopper 12 (See FIG. 1) form the opening therein for receiving the off-loading end 56 of the upper conveyor A and thus, the material M. A cuilain (not shown) covers the opening and drags over the surface of the material M being received from upper conveyor A. A back panel (not shown) is attached to the hopper 12 below the upper conveyor A.

In the preferred embodiment, a pulley 18a (See FIG. 6) extends across the opening in the hopper 12 and is attached to each side of the hopper 12. The conveyor belt 58 of the upper conveyor A is rotatably attached to the pulley 18a. A motor 18 controls the speed of the pulley 18a, thereby controlling the speed of rotation of the belt 58 of the upper conveyor A around the pulley 18a, and thus controlling the rate at which material M enters the hopper 12 from the upper conveyor A.

Although the upper conveyor A is rotatably attached to the hopper 12 in the preferred embodiment, in an alternative embodiment, the upper conveyor A could be completely independent from the hopper 12. In such an embodiment, it is still desirable to have the off-loading end 56 of the upper conveyor A disposed within the hopper 12 to off-load the material M. However, in such an alternative embodiment, the conveyor A would be controlled by an independent motor, eliminating the need for motor 18 of the preferred embodiment.

Returning to FIGS. 1, 2 and 6, the sidewall 22 of the hopper 12 extends on each side of the off-loading end 56 of the upper conveyor A. As sidewall 22 extends therefrom, it becomes generally arcuately shaped, thereby creating a chamber in the hopper to hold a desired level of material M in the hopper 12 while transferring the material M to the chute 14. The desired amount of material M maintained within the hopper 12 is commonly referred to as a heel 68 (See FIG. 4A) of material M. It is desirable to maintain the heel 68 of material M at a level near the bottom of the hopper 12, close to gate 30 so that the pulley 18a is free to rotate to off-load the material M, thereby maintaining a choked flow condition. The heel 68 of material is defined as a material flow cross sectional area being equal, or substantially equal to that of the opening existing between hopper 12 and chute 14 as is maintained through adjustment of gate 30 and choke 16.

Below the upper conveyor A, the hopper 12 extends downward to communicate with chute 14. As it extends downward, hopper 12 has a funneling angle 64 which angles the hopper 12 downward, terminating in a bottom edge 60. The hopper 12 is funneled such that its open bottom (not shown) corresponds to an open top (not shown) created by the top edge 62 of chute 14. The open bottom (not shown) of hopper 12 extends slightly into the sidewall 22 of the hopper 12 from the bottom edge 60 of the hopper 12, and is defined by hood 52 of hopper 12, as shown in FIG. 1. The lower opening in the sidewall 22 of the hopper 12 is partially covered by the hood 52 of the hopper 12 at a downward diagonal direction. The lower opening of the sidewall 22 receives a top portion of a choke 16. The choke 16 is substantially within the chute 14, and only slightly extends into the hopper 12 such that when the chute 14 is tilted in either a back and forth direction or a lateral direction (as discussed below), the top panel 16a and the sidewall 16b of the choke 16 clear the sidewall 22 of the hopper 12, and do not contact with the sidewall 22.

Referring to FIGS. 1, 2, 3 and 4, the hopper 12 has a gate 30 slidably attached to the interior of the hopper 12 below the upper conveyor A. The gate 30 is slidably attached along the sidewall 22 of the hopper 12 at a downward, funneling angle 64. The gate 30 is slidably attached to the hopper 12 using a track system (not shown) similar to those commonly used with sliding drawers, wherein the track (not shown) is attached to the interior of hopper 12, and the gate 30 slides in the track. However, any other suitable method of slidably attaching the gate 30 to the hopper 12 is acceptable. The gate 30 slides diagonally downward and across the hopper 12 from an open position shown in FIG. 3 to a closed position shown in FIG. 4, or anywhere there between as shown in FIG. 2.

In the preferred embodiment, the gate 30 is controlled by a motor (not shown). However, in the alternative, it is possible to manually control the gate 30. In such an alternative embodiment, the gate 30 would need to be accessible from the outside of the hopper 12. Access to the gate 30 could be achieved by placing at least one, and perhaps two access slits (not shown) in the hopper 12 at its funneling angle 64. Control levers (not shown) attached to the gate 30 would extend through the access slits. The operator could then adjust the gate 30 simply by moving the levers up or down the access slits to the desired location. Furthermore, although the gate 30 is described as being slidably attached to the hopper 12 such that the gate 30 slides across the hopper 12 diagonally, the gate 30 could he oriented horizontally, or any angles there between within the hopper 12.

As shown in FIGS. 1 and 6, a door 24 is hingedly attached to the hopper 12 in the preferred embodiment. The door 24 forms the arcuate shape of the sidewall 22, and covers an opening in the hopper 12 which is substantially across from the opening (not shown) for receiving the upper conveyor A and the material M. As shown in FIG. 6, the door 24 allows access to the off-loading end 56 of the upper conveyor A and the gate 30 for purposes of repair, maintenance or cleaning. Furthermore, the door 24 allows the heel 68 of material M to be removed from the hopper 12 in the event of malfunction or break down of the device 10, or of the sensors 26 and 28. As shown the door 24 is hingedly attached to the hopper 12 along sidewall 22 such that the door 24 opens in a horizontal plane (See FIG. 6). However, it is to be understood that the door 24 could be hingedly attached to top panel 20 such that the door 24 could open in a vertical plane. In such an embodiment, it would be desirable to have an air cylinder (not shown) or other appropriate raising device attached to the hopper 12 and the door 24 to raise the door 24 and maintain the door 24 in the open position.

Figure 4:
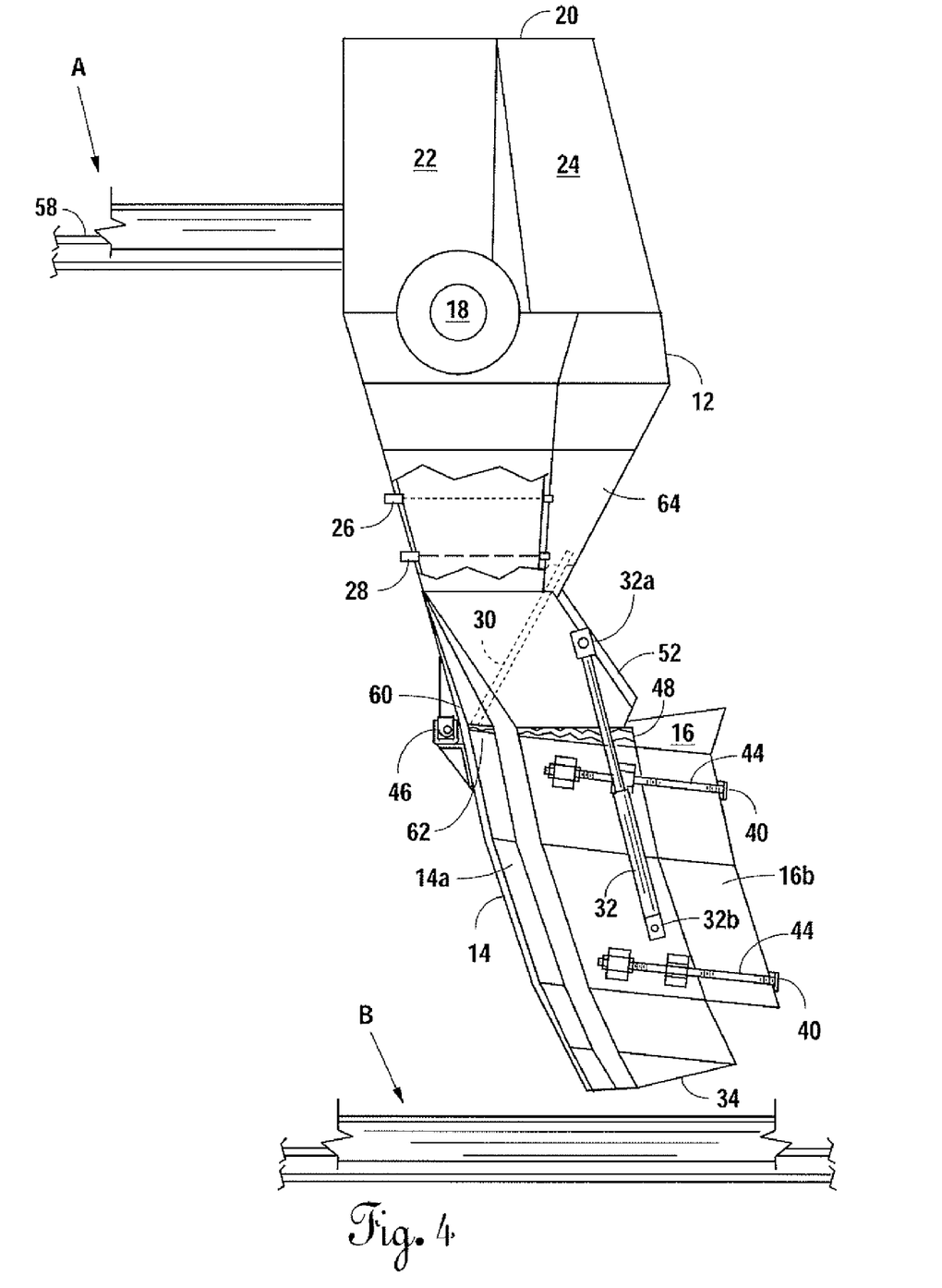
FIG. 4 is a side view of the present invention showing the gate in its closed position and the choke in its open position.

Referring to FIGS. 1, 2 and 4, an upper level sensor 26 and a lower level sensor 28 are disposed inside the hopper 12. The lower level sensor 28 senses a rate of flow of material M across the lower level sensor 28, and relays that information via a signal to a control unit 50 (See FIG. 7). In a condition where the flow of material M across the lower level sensor is at a desirable rate, the control unit 50 controls (a) the motor of the upper conveyor, (b) the position of the gate, and/or (c) the position of the choke to maintain the desirable rate of flow of material through the hopper. A desirable rate of flow of the material M across the lower sensor 28 is a rate which maintains the heel 68 of material M between lower level sensor 28 and upper level sensor 26 (See FIG. 4A). The lower level sensor 28 also senses a level of the material M maintained within the hopper 12 that is undesirably too low. Similarly, the upper level sensor 26 is positioned inside the hopper 12 at a desired position to sense a level of material M maintained within the hopper 12 that is undesirably too high. Thus, the upper level sensor 26 and the lower level sensor 28 sense an undesirable level of material M in the hopper 12. Examples of such upper level and lower level sensors include, but are not limited to, radio frequency sensors, tilt switch sensors, flow sensors or nuclear sensors.

Referring to FIG. 1, the chute 14 is disposed below the hopper 12. The chute 14 has an open top (not shown) and an open bottom 34, and has a generally arcuately shaped sidewall 14a (See FIG. 2). The opening 34 in the bottom of the chute 14 extends into the sidewall 14a of the chute 14 and connects with the open top of the chute 14, creating an opening 66 in the sidewall 14a of the chute 14. The opening 66 in the sidewall 14a of the chute 14 substantially corresponds to the opening in the lower portion of the sidewall of the hopper 12, and receives a choke 16.

Figure 5:
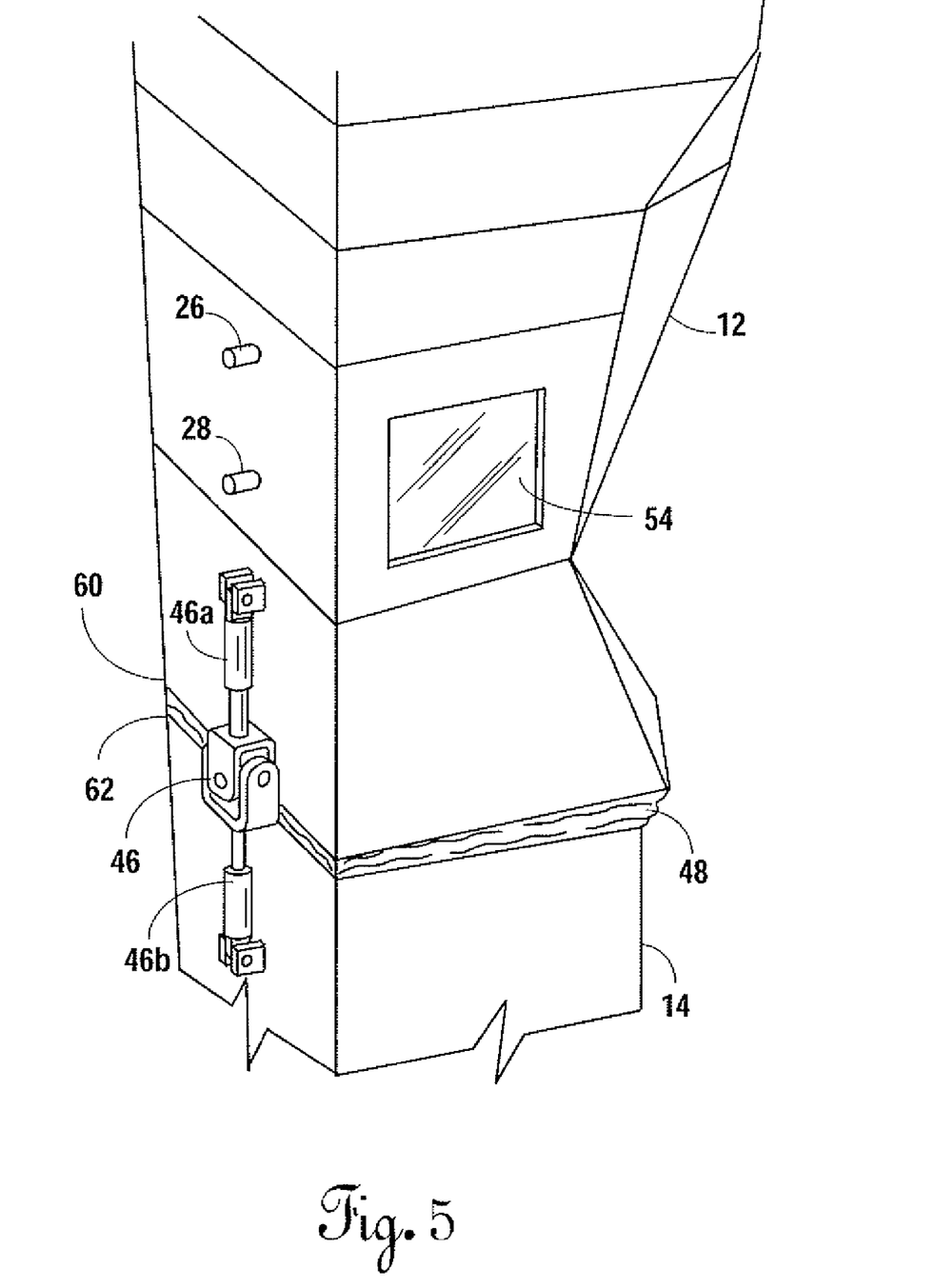
FIG. 5 is a perspective view of the present invention showing the communication of the chute with the hopper.

Referring to FIGS. 1 and 5, a universal joint 46 attaches the chute 14 to the hopper 12. The chute 14 is disposed slightly below the bottom edge 60 of the hopper 12. A flexible sleeve 48 is disposed between the hopper 12 and the chute 14, and surrounds the circumference of the hopper 12 and the chute 14, and extends between the hood 52 of the hopper 12 and the top panel 16a of the choke 16. The flexible sleeve 48 is made of a flexible rubber, or other suitable flexible material. The flexible sleeve 48 and the universal joint 46 allow the chute 14 to move in both a direction transverse to the direction of belt travel (not shown) of the lower conveyor B, and a direction of an axis of the belt travel (not shown) of the lower conveyor B.

Returning to FIGS. 1 and 2, the chute 14 is further attached to the hopper 12 by two tilting members 32. The tilting members 32 are attached on substantially opposite sides of the device 10 with respect to one another. An upper end 32a of the tilting member 32 is attached to the hopper 12, and a lower end 32b is attached to the chute 14. As shown and described, the tilting member 32 can be an air cylinder, hydraulic cylinder or motor, as are commonly known.

Figure 7:
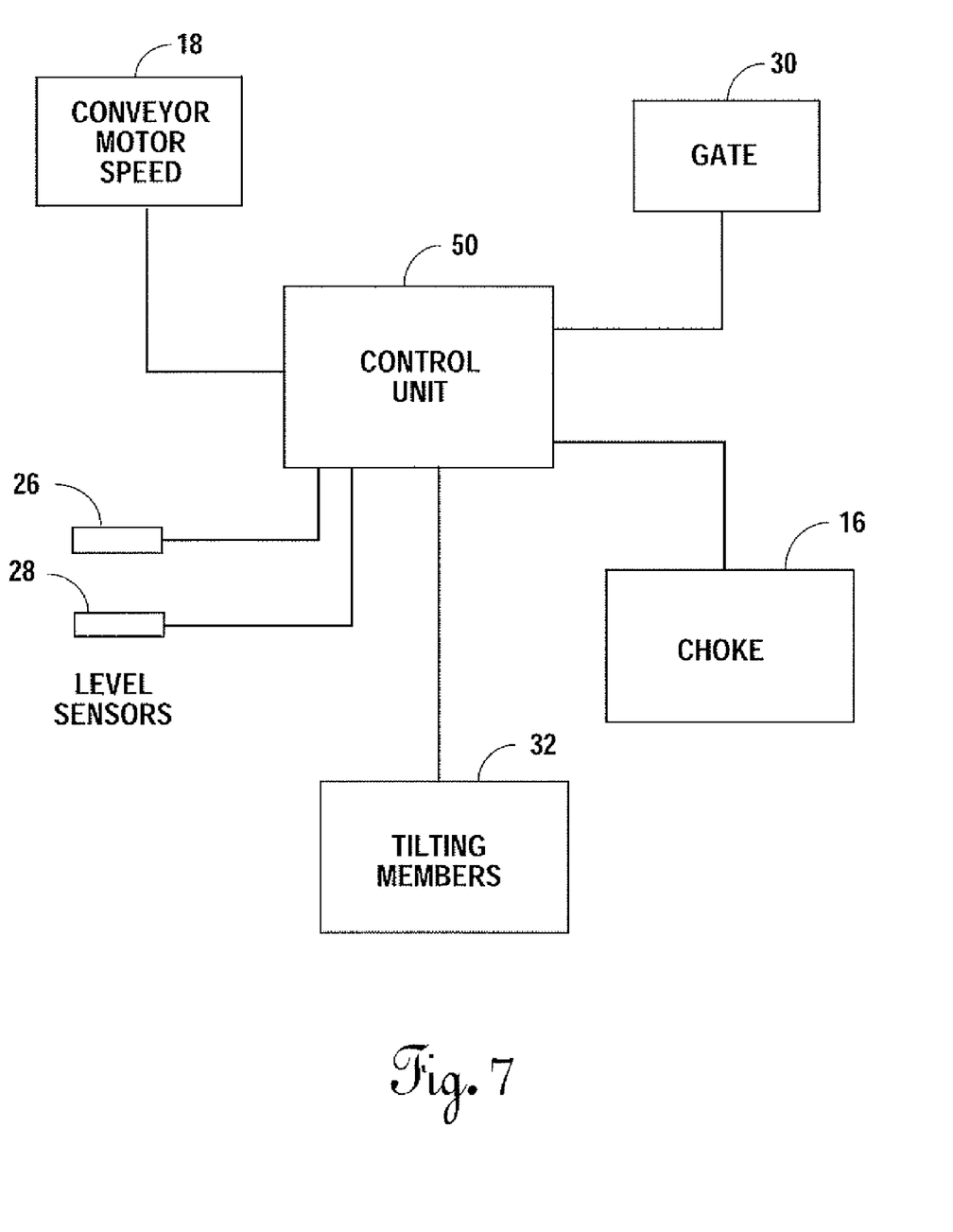
FIG. 7 is a block diagram showing the relationship of components of the present invention with a control unit of the present invention.

In operation, the tilting members 32 move the chute 14 in a direction of travel of the axis of a belt (not shown) of the lower conveyor B as well as a direction transverse to the travel of the belt (not shown) of the lower conveyor B. Referring to FIG. 7, the tilting members 32 are controlled by a control unit 50. The control unit 50 can be activated manually to control the tilting members 32 in the preferred embodiment.

However, alternatively, it is possible for the control unit 50 to control the tilting members 32 in response to a predefined event. By way of example, a predefined event could be defined as the chute 14 being an undesirable distance from the lower conveyor B, or an event could be defined as an undesirable level of material M in the chute 14. Such a predefined event would need to be sensed by at least one sensor (not shown), or other suitable sensing device in the chute 14, and would need to be capable of sending an event signal to the control unit 50. In response to such an event signal, the control unit 50 would automatically tilt the chute 14 without need of manual input.

Returning to FIG. 1, when the tilting members 32 are activated to tilt the chute 14 in the direction of travel of the axis of the belt of the lower conveyor B, both tilting members 32 either retract or extend substantially correspondingly to achieve tilt of the chute 14 in the direction of travel of the axis of the belt of the lower conveyor B. For instance, if it is desired to tilt the chute 14 closer to the lower conveyor B, activation of the tilting members 32 will cause both shafts 32c of the tilting members 32 to extend from their cylinders 32d, thereby tilting the chute 14 downward. Likewise, if it is desired to tilt the chute 14 upward from the lower conveyor B, activation of the tilting members 32 will cause both shafts 32c of the tilting members 32 to retract into their cylinders 32d, thereby tilting the chute 14 upward.

Conversely, if tilt of the chute 14 in the direction transverse to the direction of travel of the belt of the lower conveyor B is desired, activation of the tilting members 32 will cause the shaft 32c of a first tilting member 32 to extend from its cylinder 32d, while the shaft 32c of the second tilting member 32 will retract into its cylinder 32d to a position substantially opposite the extension of the shaft 32c of the first tilting member 32.

Figure 3:
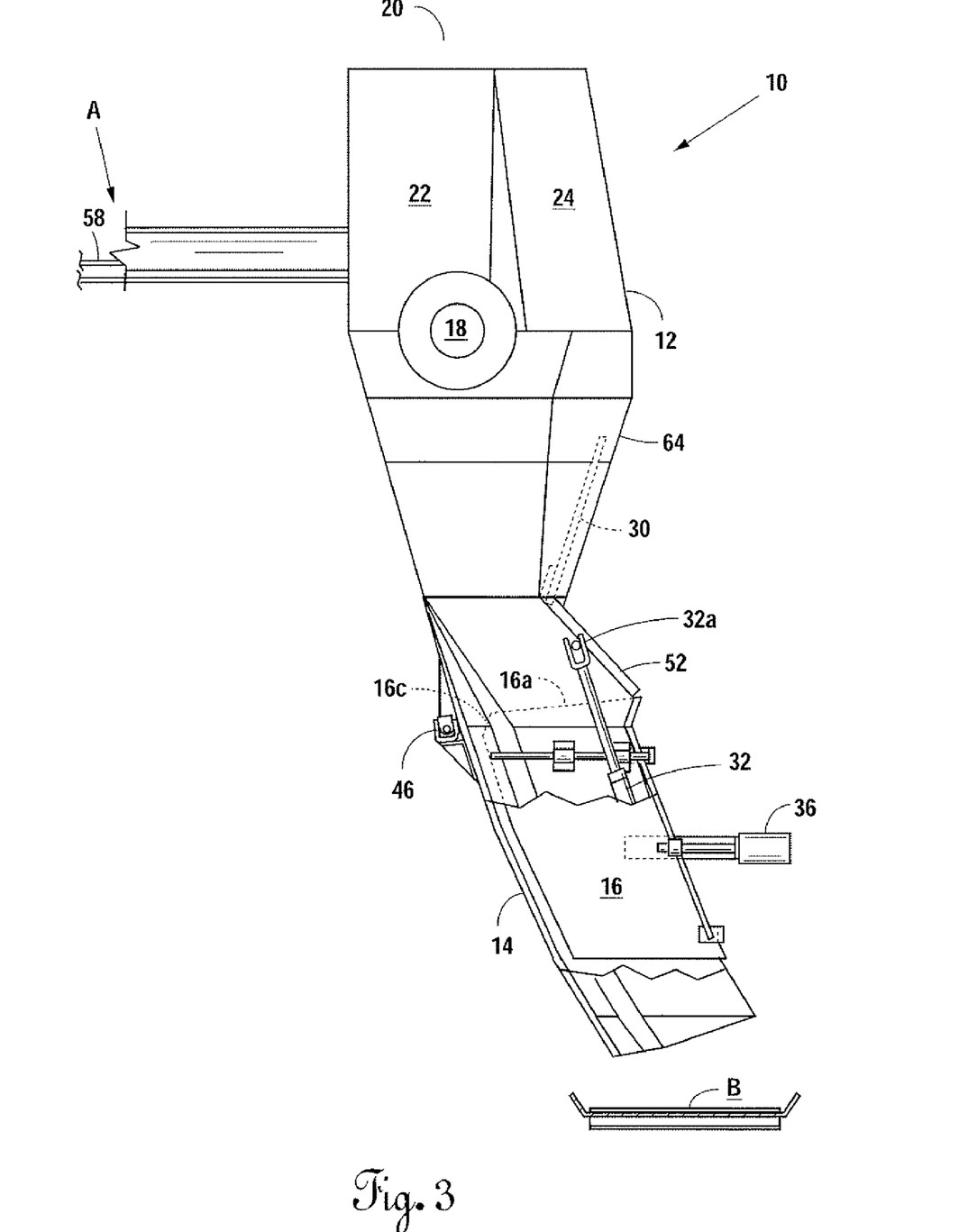
FIG. 3 is a side view of the present invention showing the choke in its closed position and the gate in its open position.
Figure 4A:
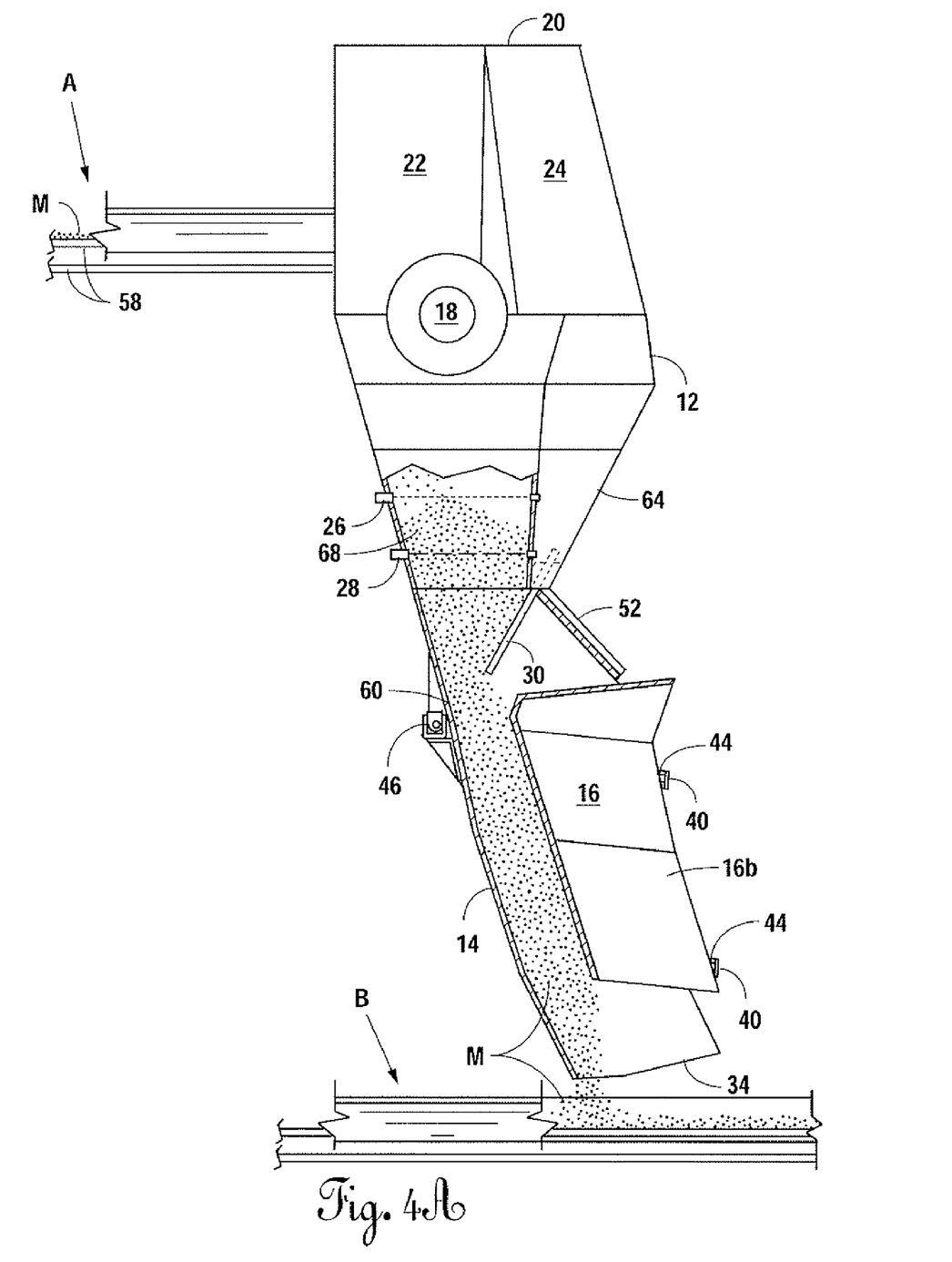
FIG. 4A is a side view of the present invention showing the material being transferred through the device.

With regard to the orientation of the chute 14 to the lower conveyor B, the chute 14 can be oriented perpendicular to the direction of belt travel of lower conveyor B, as shown in FIGS. 2 and 3, to parallel with the direction of belt travel of the lower conveyor B, as shown in FIGS. 1, 4 and 4A, or at any angles there between.

Referring to FIG. 1, the choke 16 of the present invention is slidably attached to the chute 14 by sliding shafts 44. Sliding shafts 44 are attached to the chute 14 and extend to a sliding bracket 40. The choke 16 has a top panel 16a attached to a sidewall 16b, and an open bottom that substantially corresponds with the open bottom 34 of the chute 14. The top panel 16a extends at a slightly downward angle as it extends toward universal joint 46 (See FIG. 3). The sidewall 16b of the choke 16 extends from the top panel 16a at a diagonal angle 16c (See FIG. 3) substantially the same as the angle of the gate 30 (See FIG. 3). This diagonal angle 16c of the sidewall 16b accommodates the sliding of the gate 30 so that the gate 30 may slide in close proximity to the top panel 16a of the choke 16 during operation (See FIG. 4A). The remainder of the sidewall 16b of the choke 16 is substantially congruent in shape with the sidewall 14a of the chute 14, and is slightly smaller than the sidewall 14a of the chute 14. The top panel 16a and sidewall 16b of the choke 16 is of a sufficient distance below the hood 52 of the hopper 12 to accommodate maximum tilt of the chute 14 with respect to the lower conveyor B without causing the top panel 16a or sidewall 16b to contact the hood 52. However, the flexible sleeve 48 (See FIG. 4) extends to and is disposed between the hood 52 and the choke 16 (See FIG. 1) to prevent the material M from escaping the device 10.

A mounting bracket 38 is attached to the chute 14 on each side thereof and extends across the opening in the chute 14 external to the choke 16. The bracket 38 supports a motor 36. The motor 36 is disposed outside the opening of the choke 16 (See FIG. 3).

The motor 36 is attached to a sliding member 42, which is in turn attached to a sliding bracket 40. The sliding bracket 40 is attached to the choke 16 and the sliding shafts 44. As shown, the sliding member 42 is threaded, and the sliding bracket 40 is threadedly attached to the sliding member 42. Activation of the motor 36 rotates the sliding member 42, moving the sliding bracket 40, thus sliding the choke 16 within the chute 14. The choke 16 is slidable from an open position (See FIG. 1) to a restricted flow position (see FIG. 3), or anywhere there between. Although the sliding member 42 is described as being threadedly attached to the sliding bracket 40, the sliding member 42 could take other forms. For instance, the sliding member 42 could be an air cylinder or hydraulic cylinder attached from mounting bracket 38 to sliding bracket 40. Furthermore, the sliding member 42 could be connected directly from the mounting bracket 38 to the choke 16, thereby eliminating the need for a sliding bracket 40.

Referring to FIG. 4A, in operation, material M is off-loaded from the upper conveyor A into the hopper 12. The gate 30 is adjusted to a desired position such that the heel 68 of material M is maintained between upper level sensor 26 and lower level sensor 28. The heel 68 of material M prevents induced air from flowing up through the chute 14 into the hopper 12. Since air cannot flow from the chute 14 to the hopper 12, material dust is prevented from being stirred up and exiting out of the opening (not shown) of the hopper 12 and into the ambient environment.

The material M flows from the hopper 12, past the gate 30 and into the chute 14. As the material M passes into the chute 14, the choke 16 is adjusted inside the chute to a position which allows material M to flow through the chute 14, but substantially reduces the flow of induced air through the material M. By providing Just enough space for the material M to flow through the chute 14, but not enough space for air to flow through the chute 14, the material M is constantly in contact with the chute 14 or the choke 16, thereby reducing induced airflow. By substantially reducing induced airflow, the static pressure which emanates from material M when the material M's fall or projection is terminated is reduced. This reduces an accumulation of high pressure which would otherwise flow up through the chute 14 and cause material dust to be produced.

Referring to FIG. 4A, in the preferred embodiment, the heel 68 of material M is maintained in the hopper 12 at a desired level between upper level sensor 26 and lower level sensor 28. When the heel 68 of the material M is maintained in the desired position, the lower level sensor 28 senses the rate of flow of the material M, and relays that information in the form of a signal (not shown) to the control unit 50 (See FIG. 7). The control unit 50 in turn controls (a) the motor of the upper conveyor, (b) the position of the gate, and/or (c) the position of the choke to maintain the desirable rate of flow of material through the hopper. In this manner, the lower level sensor 28 is in substantially constant communication with the control unit 50. However, in the alternative, the lower level sensor 28 may send flow rate signals to the control unit 50 on a predetermined intermitted basis—for example, every ten seconds or fifteen seconds.

Referring to FIG. 7, in the event that the heel 68 of material M maintained in the hopper 12 rises above upper level sensor 26, an event signal is sent by the upper level sensor 26 to a control unit 50. In response to the event signal received, the control unit 50 will (a) slow the speed of the upper conveyor motor 18, (b) slide the gate 30 to allow the material M to flow through the hopper at a faster rate, and/or (c) slide the choke 16 to allow the material M to exit the chute 14 to the lower conveyor B at a faster rate.

In the event that the heel 68 of material M maintained in the hopper 12 falls below lower level sensor 28, an event signal is sent by the lower level sensor 28 to the control unit 50. In response to the event signal received, the control unit 50 will (a) increase the speed of the upper conveyor motor 18, (b) slide the gate 30 to allow material M to flow through the hopper at a slower rate, and/or (c) slide the choke 16 to allow the material M to exit the chute 14 to the lower conveyor B at a slower rate.

It is to be understood that, depending on the event signal, the control unit 50 may make any of the above adjustments singularly, or any combination of adjustments together to return the heel 68 of material M in the hopper 12 to a desired level between upper level sensor 26 and lower level sensor 28. It is further understood that the control unit 50 could be any control subsystem capable of receiving signal input and sending control output in response to signal input. Furthermore, it is understood that the control system 50 could control the choke 16 independently from responding to an event signal from sensors 26 and/or 28. Also, although the present invention is described as having an upper level sensor 26 and a lower level sensor 28, it is possible to have a single level sensor 28. In such an embodiment the sensor 28 would sense a desirable amount of material M in the hopper 12 as well as sense the rate of flow of material M through hopper 12. In the further alternative, more than two sensors could be used. For instance, a rate sensor (not shown) could sense the rate of flow of material M through the hopper 12. In such an embodiment, the lower level sensor 28 would only sense an amount of material M that is undesirably too low, whereas the upper level sensor 26 would continue to sense an amount of material M that is undesirably too high.

Although the present invention is disclosed as being controlled by control unit 50, in the alternative, the device could be operated either partially or entirely manually. As discussed above, the gate 30 could be operated manually by having levers (not shown) disposed through access slits (not shown) in the hopper 12 to move the gate 30. In such an alternative embodiment, it would be desirable to have a sight window 54 (See FIG. 5) in the hopper 12 so that the level of material M maintained therein could be easily determined. Likewise, the choke 16 could be manually operated. For example, instead of using a motor 36 (See FIG. 1) to turn sliding member 42 to slide the choke 16 within the chute 14, a wheel (not shown) may be attached to the sliding member 42. In such an embodiment, the wheel would be turned to turn the threaded sliding member 42, thereby sliding the sliding bracket 40 to slide the choke 16 within the chute 14. Likewise the chute 14 could be manually adjusted to the desired tilted position so long as tilting members 32 can be secured when the chute 14 is in the desired position.

Although the present invention has been described as having a gate 30 to maintain a heel of material M in the hopper 12, it is possible to eliminate the gate 30 altogether. In such an embodiment, the top panel 16a of the sidewall 16b of the choke 16 functions as a gate 30, thereby eliminating the need for a separate gate 30 in the hopper 12.

Although the invention has been described with reference to specific embodiments, this description is not meant to be construed in a limited sense. Various modifications of the disclosed embodiments, as well as alternative embodiments of the invention will become apparent to persons skilled in the art upon the reference to the description of the invention. It is, therefore, contemplated that the appended claims will cover such modifications that fall within the scope of the invention.

We claim:

1. A device for reducing dust emissions from material during transfer of said material from an upper conveyor to a lower conveyor comprising:
   a hopper for maintaining a predefined amount of said material therein while transferring said material to said lower conveyor, said hopper defining an opening for receiving an end of said upper conveyor and said material from said upper conveyor;
   a gate for controlling transfer of said material from said hopper to a chute, said gate being slidably attached to said hopper;
   said chute receiving said material from said hopper and transferring said material to said lower conveyor, said chute being disposed below said hopper and defining an opening along a lower portion of said chute;
   a choke for reducing airflow within said chute, said choke being disposed substantially within said opening of said chute and slidably attached to said chute;
   said choke reducing airflow within said chute; and
   said predefined amount of material in said hopper preventing airflow from said chute into said hopper.

2. The device as recited in claim 1 further comprising a pulley attached to said hopper and extending across said opening of said hopper for rotationally attaching a belt of said upper conveyor to said hopper; and
   a motor connected to an energy source and said upper conveyor for driving said belt and controlling rate of the transfer of said material from said upper conveyor to the hopper.

3. The device as recited in claim 2 wherein said gate is slidably attached to an angular wall of said hopper and slides diagonally down and across said hopper to control the rate of flow of said material from said hopper into said chute.

4. The device as recited in claim 2 wherein said choke comprises a top panel connected to a sidewall, said sidewall having a bottom edge and being substantially congruent with said chute.

5. The device as recited in claim 3 wherein said choke comprises a top panel connected to a sidewall, said sidewall having a bottom edge and being substantially congruent with said chute.

6. The device as recited in claim 5 further comprising:
   a motor attached to an energy source and said chute; and
   a sliding member attached to said motor and said choke, wherein said motor is energized to move said sliding member to slide said choke within said chute.

7. The device as recited in claim 6 further comprising:
   at least one sensor disposed within said hopper above said gate, said sensor sensing an amount of said material in said hopper; and
   a control subsystem in communication with said sensor, said motor of said upper conveyor, said gate, and said motor of said choke, said control subsystem (a) receiving a predefined event signal from said sensor, said predefined event being an undesirable amount of said material maintained within said hopper, and (b) controlling said upper conveyor, said gate, or said choke in response to said signal.

8. The device as recited in claim 7 wherein said at least one sensor senses a rate of flow of said material through said hopper, and said predefined event is a desirable rate of flow said material through said hopper.

9. The device as recited in claim 6 further comprising:
   a universal joint attaching said chute to said hopper;

a flexible sleeve disposed between said hopper and said chute;

a first tilting member having a top end attached to said hopper and a bottom end attached to said chute;

a second tilting member having a first end attached to said hopper and a bottom end attached to said chute and being substantially opposite the device with respect to said first tilting member;

said universal joint, said first tilting member and said second tilting member providing (a) tilt of said chute in a direction transverse to a travel direction of a belt of said lower conveyor, said belt being rotatably attached to said lower conveyor, and (b) tilt of said chute in said direction of travel of said belt of said lower conveyor.

10. The device as recited in claim 7 further comprising:

a universal joint attaching said chute to said hopper;

a flexible sleeve disposed between said hopper and said chute;

a first tilting member having a top end attached to said hopper and a bottom end attached to said chute;

a second tilting member having a first end attached to said hopper and a bottom end attached to said chute and being substantially opposite the device with respect to said first tilting member;

said universal joint, said first tilting member and said second tilting member providing (a) tilt of said chute in a direction transverse to a travel direction of said belt of said lower conveyor, said belt being rotatably attached to said lower conveyor, and (b) tilt of said chute in said direction of travel of said belt of said lower conveyor.

11. The device as recited in claim 9 wherein said hopper further comprises a door disposed above said gate and substantially opposite said opening for receiving the material from said upper conveyor, said door covering a second opening in said hopper.

12. The device as recited in claim 10 wherein said hopper further comprises a door disposed above said gate and substantially opposite said opening for receiving said material from said upper conveyor, said door covering a second opening in said hopper.

13. A system for reducing dust emissions from material during transfer of said material from an upper conveyor to a lower conveyor comprising:

said upper conveyor transferring said material to a hopper, said upper conveyor being rotatably attached to said hopper;

said hopper maintaining a predefined amount of said material therein while transferring said material to said lower conveyor, said hopper defining an opening for receiving an end of said upper conveyor and said material from said upper conveyor;

a gate for controlling rate of flow of said material from said hopper to a chute, said gate being slidably attached to said hopper;

said chute receiving said material from said hopper and transferring said material to said lower conveyor, said chute being disposed below said hopper and defining an opening along a lower portion of said chute for receiving a choke;

said choke reducing airflow within said chute, said choke being disposed substantially within said opening of said chute and slidably attached to said chute; and said lower conveyor disposed below said chute for receiving said material from said chute and transferring said material away there from.

14. The system as recited in claim 13 further comprising a pulley attached to said hopper and extending across said opening of said hopper for rotationally attaching a belt of said upper conveyor to said hopper; and a motor connected to an energy source and said upper conveyor for driving said belt around said pulley, thereby controlling rate of transfer of said material from said upper conveyor to said hopper.

15. The system as recited in claim 14 further comprising:

a motor attached to an energy source and said chute;

a sliding member attached to said motor of said chute and said choke, wherein said motor is energized to move said sliding member to slide said choke within said chute;

at least one sensor disposed within said hopper above said gate for sensing an amount of said material in said hopper; and a control subsystem in communication with said sensor, said motor of the upper conveyor, said gate, and said motor of said choke, said control subsystem (a) receiving a predefined event signal from said sensor, said predefined event being an undesirable amount of material maintained within said hopper, and (b) controlling said upper conveyor, said gate, and said choke in response to said signal.

16. The system as recited in claim 15 wherein said at least one sensor senses a rate of flow of said material through said hopper and said predefined event is a desirable rate of flow of said material through said hopper.

17. The system as recited in claim 15 further comprising:

a universal joint attaching said chute to said hopper;

a flexible sleeve disposed between said hopper and said chute;

a first tilting member having a top end attached to said hopper and a bottom end attached to said chute; and a second tilting member having a first end attached to said hopper and a bottom end attached to said chute and being substantially opposite the device with respect to said first tilting member.

18. The system as recited in claim 15 wherein rate of flow of said material through said gate is adjusted by said gate to allow a predefined level of said material to be maintained in said hopper during transfer of said material from said upper conveyor to said lower conveyor.

19. The system as recited in claim 15 wherein said choke is adjusted within said chute such that airflow within said chute is substantially reduced.

20. The system as recited in claim 17 wherein said universal joint, first tilting member and second tilting member provide (a) tilt of said chute in a direction transverse to a travel direction of said belt of said lower conveyor, said belt being rotatably attached to said lower conveyor, and (b) tilt of said chute in said direction of travel of said belt of said lower conveyor.

21. The system as recited in claim 19 wherein said hopper further comprises a door disposed above said gate and substantially opposite said opening for receiving said material from said upper conveyor, said door covering a second opening in said hopper.

22. The system as recited in claim 20 wherein said hopper further comprises a door disposed above said gate and substantially opposite said opening for receiving said material from said upper conveyor, said door covering a second opening in said hopper.

23. A method for reducing dust emissions from material during transfer of said material from an upper conveyor to a lower conveyor, said method comprising the steps of:

loading said material onto said upper conveyor;

rotating said upper conveyor around a pulley to transport said material to a hopper, said pulley being attached to said hopper, discharging said material from said upper conveyor into said hopper, said hopper receiving an end of said upper conveyor and said material from said upper conveyor;

maintaining a predefined amount of said material in said hopper to prevent airflow from entering said hopper from a chute disposed below said hopper;

flowing said material from said hopper into said chute;

transferring said material from said chute to said lower conveyor; and said lower conveyor transferring said material away from said chute.

24. The method as recited in claim 23 wherein said maintaining a predefined amount of said material in said hopper step comprises the steps of:

determining an amount of said material in said hopper;

controlling the speed of said rotation of said belt of said upper conveyor; and adjusting the position of a gate slidably attached to said hopper.

25. The method as recited in claim 23 comprising the additional step of reducing airflow through said material in said chute.

26. The method as recited in claim 25 wherein said reducing step comprises the step of sliding a choke disposed within said chute and slidably attached to said chute to allow said material to flow through said chute while reducing airflow through said chute.

27. The method as recited in claim 24 comprising the additional step of reducing airflow through said material in said chute.

28. The method as recited in claim 27 wherein said reducing step comprises the step of sliding a choke disposed within said chute and slidably attached to said chute to allow said material to flow through said chute while reducing airflow through said chute.

29. The method as recited in claim 24 wherein said determining step comprises sensing an amount of said material in said hopper by at least one sensor disposed within said hopper above said gate.

30. The method as recited in claim 29 wherein said sensing step further comprises sending a predefined event signal from said sensor to a control subsystem.

31. The method as recited in claim 30 wherein said control subsystem performs said controlling the speed of said upper conveyor step and said adjusting the position of said gate step in response to said sending a predefined event signal step.

32. The method as recited in claim 27 wherein said determining step comprises sensing an amount of said material in said hopper by at least one sensor disposed within said hopper above said gate.

33. The method as recited in claim 32 wherein said sensing step further comprises sending a predefined event signal from said sensor to a control subsystem, said predefined event being an undesirable amount of said material maintained within said hopper.

34. The method as recited in claim 33 wherein said control subsystem performs said controlling the speed of said upper conveyor step, said adjusting the position of said gate step and said sliding of the choke step in response to said sending a predefined event signal step.

35. A method for reducing dust emissions from material during transfer of said material from an upper conveyor to a lower conveyor, said method comprising the steps of:

loading said material onto said upper conveyor;

rotating a pulley to rotate a belt of said upper conveyor to transport said material to a hopper, said pulley being rotated by a motor to rotate said belt of said upper conveyor;

discharging said material from said upper conveyor into said hopper, said hopper receiving an end of said upper conveyor and said material from said upper conveyor;

maintaining a predefined amount of said material in said hopper to prevent airflow from entering said hopper from a chute disposed below said hopper;

reducing airflow through said material in said chute;

flowing said material from said chute on to said lower conveyor; and said lower conveyor conveying said material away from said chute.

36. The method as recited in claim 35 wherein said maintaining a predefined amount of said material in said hopper step comprises the steps of:

determining an amount of said material in said hopper;

controlling the speed of said rotation of said belt of said upper conveyor; and sliding a choke disposed within said chute and slidably attached to said chute to allow said material to flow through said chute while maintaining a said predefined amount of said material in said hopper.

37. The method as recited in claim 36 wherein said reducing airflow through said material in said chute step comprises the step of sliding said choke within said chute to allow said material to flow through said chute while reducing airflow through said chute.

38. The method as recited in claim 35 wherein said reducing airflow through said material in said chute step comprises the step of sliding a choke within said chute to allow said material to flow through said chute while reducing airflow through said chute.

39. The method as recited in claim 36 wherein said determining step comprises sensing an amount of said material in said hopper by at least one sensor disposed within said hopper.

40. The method as recited in claim 37 wherein said determining step comprises sensing an amount of said material in said hopper by at least one sensor disposed within said hopper.

* * * * *